April 8, 1969     H. HABERMANN     3,437,723
METHOD OF MAKING REFRACTORY BODIES FORMED WITH A MULTIPLICITY
OF CLOSELY SPACED LONG AND NARROW PASSAGES THERETHROUGH
Filed Oct. 26, 1965
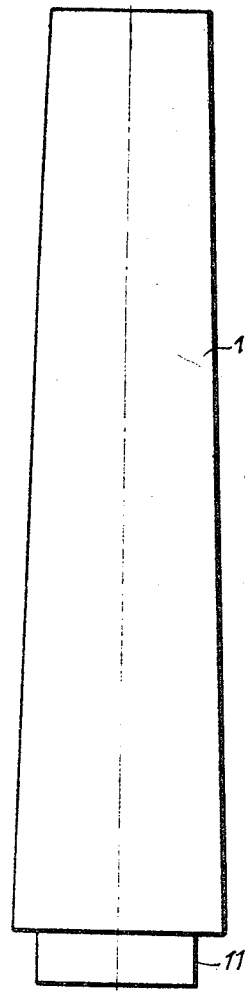
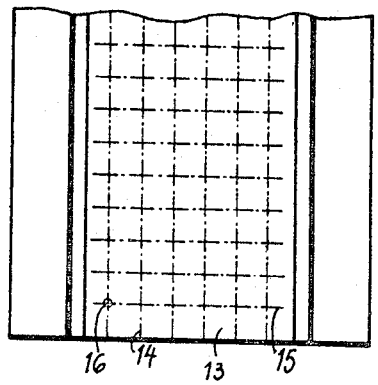
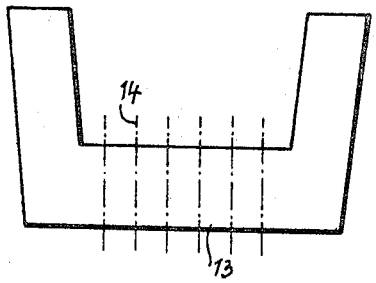
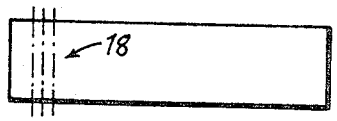
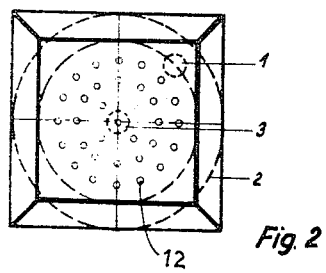
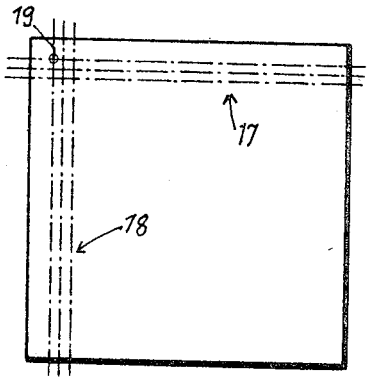
INVENTOR
HEINZ HABERMANN
BY Kurt Kelman
Agent

United States Patent Office 3,437,723
Patented Apr. 8, 1969

3,437,723
METHOD OF MAKING REFRACTORY BODIES FORMED WITH A MULTIPLICITY OF CLOSELY SPACED LONG AND NARROW PASSAGES THERETHROUGH
Heinz Habermann, Fleschgasse 34, Vienna, 13, Austria
Filed Oct. 26, 1965, Ser. No. 505,262
Claims priority, application Austria, Nov. 4, 1964, A 9,365/64
Int. Cl. B28b, 1/08
U.S. Cl. 264—69                5 Claims

ABSTRACT OF THE DISCLOSURE

Smooth-walled, closely spaced ducts having a diameter as small as 4 mm. and a length-to-diameter ratio up to 200:1 can be formed in refractory bodies mainly consisting of magnesia in a mold equipped with suitably dimensioned and arranged wire cores by gravity casting a mixture of magnesia of specified grain size distribution (FIG. 7) with 1–4% inorganic binder and 5–7% water and by removing the cores after the composition solidifies by partial evaporation of the water.

---

Figure 7:
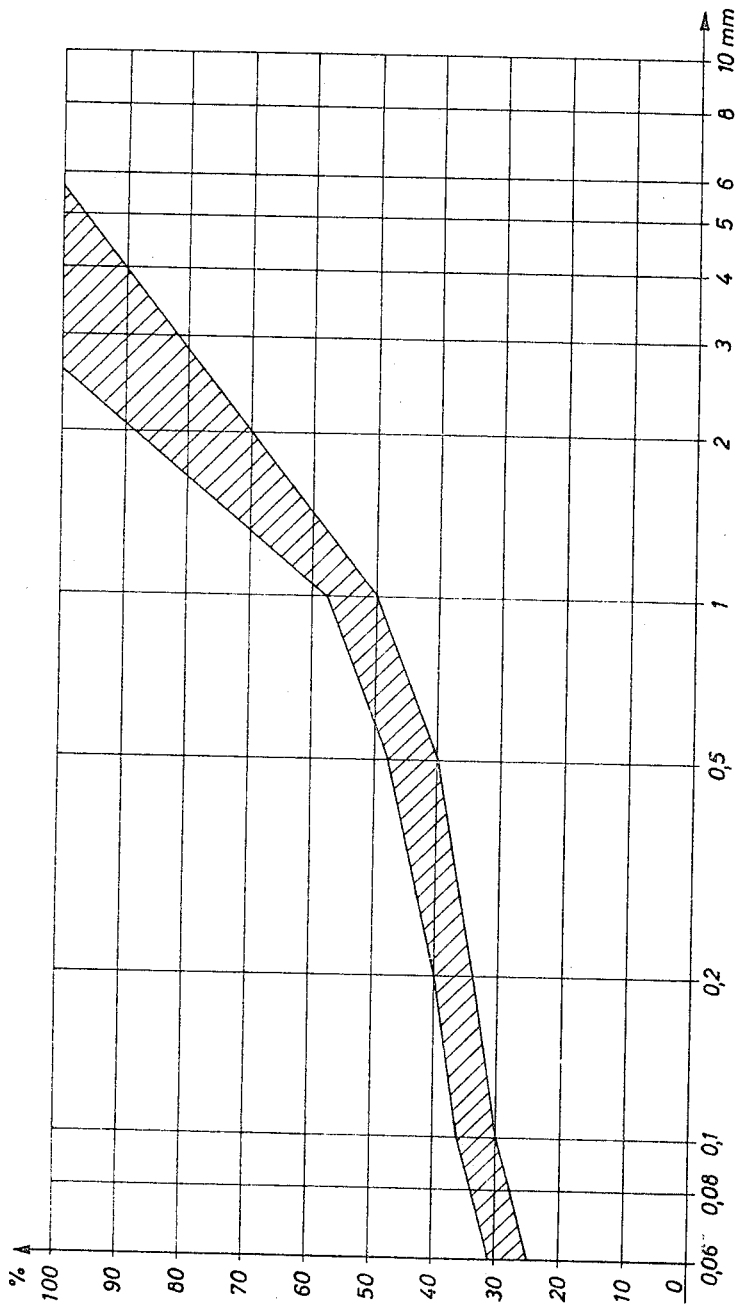

This invention relates to refractories, and particularly to a method of making refractory bodies formed with a multiplicity of closely spaced long and narrow passages therethrough.

Typical examples of such refractory bodies are the tuyere blocks of basic Bessemer steel converters. It is known to shape such blocks from magnesia compositions under hydraulic pressure in molds equipped with cores for forming the air or oxygen ducts. The ducts so formed may have an internal diameter of 14 to 16 mm. and a length of about 500 to 900 mm., for a length-to-diameter ratio of about 30:1 to 65:1.

Recent developments in steel making have led to a demand for tuyere blocks having ducts of substantially smaller diameter, and as narrow as 5 mm., while duct lengths of 1,000 mm. or more are called for, so that the ratio of length to diameter may be as high as 200:1. Such readily be prepared by the afore-described pressure molding process. The necessarily long and slender cores tend to be deformed by the applied molding pressure. Even slight deformation of the cores makes it impossible to withdraw them from the green molded body. The smallest ducts that can be produced by the known method have a diameter of 10 mm. A practical method of producing refractory bodies with long passages therethrough having a diameter of less than 10 mm. was not available heretofore. It would be entirely impossible by known pressure molding methods to produce a refractory body having a length of about 1,000 mm., a square cross section of 200 mm. x 200 mm., and having 36 longitudinal ducts therethrough, the ducts being approximately uniform distributed over the cross section and having each a diameter of 4 mm.

The object of the invention is the provision of a method which permits refractory bodies formed with very long and narrow ducts to be manufactured simply and conveniently, regardless of the diameter of the ducts.

I have found that the difficulties inherent in the conventional pressure-molding process can be avoided by replacing the conventional pressure molding composition by a casting composition which has the consistency of a viscous liquid or paste and which is a continuous mixture of solids and of a liquid filling the interstices between the solid particles. Such a casting composition tends to conform to the contour of a mold under the force of gravity alone, or under forces not substantially greater than those of gravity, and the use of high pressure becomes unnecessary. Such high pressures cannot be avoided with the compositions heretofore employed for the same purpose and which retain substantial amounts of air in the voids between their solid particles.

The preferred compositions of the invention employed for the making of tuyere blocks and similar refractory bodies contain at least 85 percent MgO on a dry basis, together with the usual mineral contaminants normally present in magnesite which is the most economical source of magnesium oxide for the purpose of this invention. CaO, $Fe_2O_3$ and $SiO_2$ thus are normally present. The solid refractory material in the compositions of the invention forms grains or particles having a maximum size of 5 mm., and preferably not greater than 3 mm. The preferred compositions further contain 1 to 4 percent of a water soluble reactive binder, and an amount of water just sufficient to permit flow of the composition under the force of gravity until an exposed top surface is horizontal. In other words, the angle of repose or angle of maximum slope of the compositions of the invention is approximately zero. An excess of water is generally undesirable, but not deleterious.

The fluid composition is cast into an open mold provided with cores where ducts are to be formed in the shaped body. Entrapped air is discharged, and the solid constituents are packed tight by vibrating the mold or its contents. The mold is then placed in a drying oven to remove a portion of the water, and to make the cast body shape-retaining. The partly dried product is then removed from the mold and drying is completed. The cores may be withdrawn prior to use or they may be left in place if they are either compatible with the intended use, or volatile at the normal operating temperature of the refractory body.

The aqueous constituent of the afore-described composition may be replaced by a material which is liquid at the casting temperature, but is solid at ambient temperatures. The method of the invention may thus also be performed with viscous, fluid compositions consisting of refractory granular material meeting the particle size requirements pointed out above and to be discussed in more detail hereinafter, and consisting of burnt magnesite or dolomite, and mixed with an amount of hard pitch, tar or the like at a temperature high enough to make the composition castable. Cooling is resorted to for hardening the composition instead of drying to permit withdrawal of the green product from the mold.

The cores employed in the process of this invention are not subjected to heavy pressure. Thin walled metal tubes may, therefore, be employed as cores and may be left in the finished product. Very narrow ducts may be formed by cores which are metal wires having smooth surfaces, and such wires are withdrawn from the solidified castings, leaving smooth-walled narrow bores. The withdrawal of wire cores and the like is facilitated when the wire is first lubricated, and a thin tube of natural or synthetic rubber is slipped over each wire core. The wires are then readily withdrawn from their elastomeric shells, and the latter can subsequently be pulled out because they contract transversely when pulled longiutdinally. The ducts so formed have very smooth walls.

Wire cores are readily removed from casting compositions which undergo exothermic reactions during solidification if the wires are encased in thin cardboard tubes prior to casting. The tubes may be left in the ducts of the refractory shaped body. If the temperautre of the casting composition does not rise much above room temperature during solidification, the cores may be made of fusible material, such as plastics, which become liquid or evaporate during the drying process, or during a subsequent firing operation.

A dense texture of the refractory bodies which is critically important in many applications is achieved in the method of the invention without the use of high pressure. Such a texture and the smooth wall configuration of the ducts or passages, which is essential for low flow resistance, is readily produced in this method by the use of electrically or pneumatically operated vibrators, well known in themselves. A vibrator may be attached to the shell of the mold but it is preferred to immerse the vibrator in the casting composition within the mold while the composition is still fluid.

Typical examples of refractory bodies prepared by the method of the invention are shown in the attached drawing on a reduced scale, but subsatntially undistorted.

FIG. 1 illustrates a tuyere block in side elevation;
FIG. 2 shows the block of FIG. 1 in top plan view;
FIG. 3 is a fragmentary plan view of a tapping spout;
FIG. 4 illustrates the spout of FIG. 3 in front elevation;
FIG. 5 shows a gas distributor plate in side elevation;
FIG. 6 is a plan view of the plate of FIG. 5; and
FIG. 7 is a diagram of particle size distributions in the casting compositions used for making the bodies of FIGS. 1 to 6.

The tuyere block seen in FIGS. 1 and 2 has a length of 900 mm. and its maximum cross sectional dimension between oppoiste walls is 200 mm. It is of quadratic cross section and has a major portion 10 which tapers longitudinally in an upward direction, as viewed in FIG. 1. The small base portion 11 is narrower and of uniform cross section. Thirty-three straight, parallel, longitudinal ducts 12 are distributed approximately uniformly over the smallest cross section of the block and have each a diameter of 6 mm.

The tapping spout shown in FIGS. 3 and 4 has a bottom wall 13 provided wit ha multiplicity of vertical ducts therethrough. The ducts, which have a diameter of 5 mm., each are arranged in a square grid pattern defined by the intersections of two groups of equidistant parallel planes 14, 15, each plane of one group being perpendicular to the planes of the other group. Only one duct 16 is shown in FIG. 3. The illustrated tapping spout permits oxygen to be passed through a charge of molten steel while the same is being taken from a processing vessel.

The square gas distribution plate shown in FIGS. 5 and 6 has a length and width of 600 mm., and a thickness of 150 mm. 729 passages having each a diameter of 5 mm. pass through the plate in the direction of its thickness at the intersections of two groups 17, 18 of equidistant parallel planes, each group consisting of twenty-seven planes, only three planes of each group and one of the ducts 19 being shown in the drawing for the sake of clarity.

It would be extremely difficult to produce narrow ducts as closely spaced as is evident from the drawing and the afore-mentioned dimensions by pressure-molding. The press ram would have to be shaped with recesses to receive the free ends of the cores, yet the risk of buckling the cores would be great and would rapidly increase with increasing core length and decreasing core diameter. It is obviously impossible to produce the ducted bodies shown in the drawing by tamping a damp molding composition into a mold equipped with the number and shape of cores necessary. The space available between the several rows of cores would not permit the introduction of tamping tools, and the danger of buckling of the cores would be even greater than in pressure molding.

The fluid, castable mixtures of the invention spontaneously flow into the interstices between cores mounted in a mold in an upright position without undergoing local changes in particle size distribution. The cores are not significantly stressed and thus do not tend to buckle. A vibrator, which is preferably directly immersed into the casting composition, causes dense packing of the solid grains, particularly about the cores which remain in contact with the casting until the later has become shape-retaining by drying or by cooling. The green casting removed from the mold may be further dried in a conventional manner after removal of the cores without causing changes in the smooth dense structure of the walls which define the ducts. The dried castings may be fired and impregnated with carbonaceous material, such as tar, in a known manner.

Preferred practice for carrying out the method of this invention is illustrated by the following example:

An upwardly open mold conforming to the tuyere block of FIG. 1 is prepared for casting by coating its walls with mineral oil or other parting compound, or by lining its cavity with paper or the like. The 33 wire cores required for forming the. ducts in the desired product are dipped in molten paraffin, oiled or laquered, and mounted by friction fit between two longitudinally spaced plates of which one is dropped to the bottom of the mold while the other one is secured outside and above the mold. A thin rubber tube may also be slipped over the entire length of each wire, if so desired, and paper or cardboard tubes may be employed similarly, as has been described above.

One of the several water-bearing compositions to be described below is next poured into the mold and spreads between the wires cores. The usual precautions are taken during casting to minimize the amount of entrained and occluded air. A small vibrator is then immersed in the casting composition in the mold. The vibrations cause entrapped air to rise and to be released whereby the composition level in the mold drops. This shrinkage is made up by pouring additional amounts of composition into the mold.

A suitable location for insertion of the vibrator is indicated by a circle 1 in FIG. 2. If the tuyere block were of circular cross section but otherwise shaped in analogy to the illustrated block, as indicated in FIG. 2 by broken circular lines 2, the duct shown in the longitudinal axis of the block would be omitted, and the vibrator would be immersed in this area which is marked by a circle 3 in FIG. 2.

The casting composition in the mold is pre-dried at a temperature compatible with the core materials until the green casting is sufficiently shape retaining to permit its removal from the mold. A pre-drying temperature of 60° C. is suitable for wires cores whether or not they are coated with paraffin, oil or lacquer, and rubber tubing, paper or cardboard tubes also are not sensitive to such a temperature which has to be maintained for several hours. The operator's skill in handling the green casting is an important factor in determining the necessary length of the predrying period, a softer and less thoroughly pre-dried casting requiring high skill if it is not to be damaged by handling.

When the casting is ready to be removed from the mold, the wires which are readily released by the spacer plates are pulled out of the casting. If rubber tubes were initially employed, they are also withdrawn at this stage. Tubes of paper or cardboard may be left in place. The mold is then broken up to release the casting which is subjected to further drying in the following sequence: 6 hours at 60° C., 6 hours at 120° C., and 10 hours at 200° C. It may then be fired and impregnated with tar prior to use.

When the casting composition is a mixture of refractory grains with a fusible binder, for example 12% tar or pitch, the mixture is heated until its fluidity is adequate, as may readily be determined by pouring a sample from a small ladle, and it is cast into a mold which may be prepared substantially as described above. Mixtures of dolomite and tar have been employed heretofore in the imperforate portions of converter bottoms, and such known mixtures are also suitable for the method of this invention. The casting is permitted to solidify in the mold by heat exchange with the ambient air at room temperature. If so desired, it may be heated in the mold to 400°

C. for at least 12 hours in the absence of air whereby the tar or pitch is converted to coke. After-treatments after removal of the casting from the mold that are applicable to pitch or coke bonded castings will be obvious from the above.

It will be appreciated that the invention is not limited to the forming of straight ducts in refractory bodies, and that such bodies having curved passages may be made readily by means of wire cores and the casting compounds of the invention.

The particle size composition of the solid constituents in the casting compositions of the invention has an important bearing on the properties of the refractory bodies produced and should be within the limits indicated by hatching in FIG. 7 which is a semi-logarithmic plot of sieve opening sizes indicated on the abscissa versus percentage of the material passing through the sieve openings and indicated on the ordinate. The maximum grain size should not exceed 5 mm., and best results are obtained with a maximum grain size of about 3 mm. While the indicated grain size distribution produces best results with casting compositions which solidify upon cooling, the distribution limits indicated in FIG. 7 must be closely maintained in casting compositions whose fluidity is due to the presence of an aqueous liquid.

The slow rise of the percentage values between sieve sizes of 0.1 and 0.5 mm. shows that very little material of this grain size range is necessary. An adequate percentage of fines having a particle size of less than 0.06 mm. is important, and the fines should be about 30%, as shown in the drawing. As is also evident from FIG. 7, the permissible percentage range of the coarsest fraction is much wider, and less critical. The permissible maximum particle size is determined to some extent by the overall dimensions and the configuration of the object to be cast.

The grains of the coarse fraction should be as dense as possible, and should not contain more than 5% void if refractory bodies of high density are to be produced. It is often advantageous to enrich the portion of the refractory body which will face a zone of highest operating temperature with coarse particles. This may be achieved by designing the mold in such a manner that the high temperature portion of the body is located in the bottom of the mold, and by sequentially casting two compositions of which the first is richer in coarse material than the second.

This invention produces superior results, if applied to refractory materials based on magnesium oxide. The preferred refractory material whose particle size distribution is shown in FIG. 7 thus mainly consists of grains of sintered magnesia, and may consist partly or entirely of grains of fused magnesia when highest density is to be achieved. If fused magnesia is employed substantially exclusively for the coarse fraction, it is important that the remainder of the composition match the low shrinkage characteristics of fused magnesia. The use of magnesia low in iron oxide for the finer fractions is recommended under these circumstances.

The binders to be employed in magnesia-rich casting compositions of the invention may be of the same kind as are employed for chemically bonding tamped refractory magnesia compositions. Suitable binders thus include acid sodium sulfate $NaHSO_4$, sodium bisulfite, magnesium sulfate (kieserite or Epsom salt), magnesium chloride, potassium chromate, and the like, and are known in themselves. They are characterized by their ability to react with magnesium oxide.

When the binder is a sulfate or sulfite, it is employed in an amount to make the $SO_3$ or $SO_2$ content of the casting composition about 1–2% of the solids other than the binder on a dry basis. The amount of water necessary to impart fluidity to the casting composition is best determined experimentally for each set of specific conditions. Good results are generally obtained with water in an amount of approximately 6–8% of the dry solids in the casting composition. The crystal water contained in the binder has to be considered in calculating the amount of water to be added. Granular sintered magnesium oxide having a grain size distribution within the hatched area of FIG. 7 yields a very good castable composition when mixed with 1–3% Epsom salt dissolved in 5–7% water.

The green strength of the casting may be improved by addition of boric acid or borates in an amount corresponding to approximately 0.5% $B_2O_3$ calculated on the dry solids without binder. Other addition agents, such as chromite or alumina, may be employed to achieve improved resistance against dicalcium silicate erosion, a desired heat conductivity or improved resistance to thermal stresses.

Typical chemical analyses of the constituents of nine casting compositions of the invention other than water are listed in the following table in which (MgO) indicates the MgO content of the magnesium bearing granular material.

| Batch No. | Chemical composition of an average sample (percent by weight) | | | | | |
|---|---|---|---|---|---|---|
| | (MgO) | MgO | CaO | $Fe_2O_2$ | $SiO_2$ | Other |
| I | 98.0 | 94.0 | 1.0 | 0.5 | 0.5 | 4.0 |
| II | 94.5 | 90.6 | 2.6 | 0.4 | 1.8 | 4.6 |
| III | 95.0 | 91.1 | 3.1 | 0.5 | 0.6 | 4.7 |
| IV | 94.3 | 89.6 | 1.9 | 0.3 | 3.6 | 4.6 |
| V | 94.2 | 89.5 | 3.0 | 1.6 | 1.1 | 4.8 |
| VI | 94.0 | 89.2 | 2.5 | 1.3 | 2.3 | 4.7 |
| VII | 92.3 | 88.5 | 2.2 | 1.4 | 3.2 | 4.7 |
| VIII | 90.3 | 86.7 | 2.9 | 3.3 | 2.0 | 5.1 |
| IX | 89.5 | 85.8 | 2.5 | 4.7 | 1.6 | 5.4 |

The percentage figures listed as "other" include conventional additives such as alumina, the components of the binder such as $Na_2O$ and $SO_3$ and the loss on ignition which amounted to 2.0–2.2% in all batches.

EXAMPLE

The following example describes the production of a tuyere block of the conical form of FIG. 1 having a height of 900 mm. and a diameter at the lower end of 200 mm. There are provided 35 rectilinear channels each having a diameter of 5 mm. This block is made from burnt magnesia having the analysis IV of the above cited table. That magnesia has been crushed and sieved to obtain a material having the following granulometric analysis:

| Percent passing sieve: | Diameter of openings, mm. |
|---|---|
| 100 | 5.0 |
| 91 | 4.0 |
| 82 | 3.0 |
| 70 | 2.0 |
| 50 | 1.0 |
| 40 | 0.5 |
| 34 | 0.2 |
| 30 | 0.1 |
| 25 | 0.06 |

This granulometric analysis, which follows essentially the lowermost limits of the hatched field of FIG. 7, means, in other terms, the following composition:

| Grain side, mm.: | Amount in the magnesia material, percent |
|---|---|
| smaller than 0.06 | 25 |
| 0.06–0.1 | 5 |
| 0.1–0.2 | 4 |
| 0.2–0.5 | 6 |
| 0.5–1.0 | 10 |
| 1.0–2.0 | 20 |
| 2.0–3.0 | 12 |
| 3.0–4.0 | 9 |
| 4.0–5.0 | 9 |

100% of that burnt and grained magnesia are then mixed with 3% $MgSO_4 \cdot H_2O$ (magnesium sulfate) and this still dry mixture is wetted with 6% water. Thoroughly mixing leads to a castable product. Preparatory to the casting the inner surfaces of the mold (which consists preferably of sheet metal) is greased with a mineral fat or oil. The cores consisting of pieces of wire are commonly anchored in a bottom plate and a top plate respectively. This core body is dipped in molten paraffine and removed therefrom to form a paraffine coating on the core-wires and is then placed into the mold in such a way that there remains free space on the top for inserting a nozzle to be used for filling the wet mixture into the mold. An electromagnetic vibrator as known per se from the concrete technique is then allowed to work on the mold. It has been found useful to vibrate the mold already when the castable mixture is placed therein. Vibrating the mold or, eventually, its content by making use of a known vibrator, takes place over about 30 minutes. The mold is then placed in a drying oven where it is heated up to 60° C. and held at that temperature over about 6 hours. After that time the tuyere block shows sufficient strength to be taken out of the mold and to be freed from the corewires. It is then dried to its final strength. This can, but must not, be achieved by placing the block again in an oven where it is heated in following sequence: 8 hours at 60° C., 8 hours at 120° C. and 8 hours at 200° C.

According to a modification of that final drying step the block can be placed in a kiln and be fired at a temperature of about 1600° C. to a body of great strength.

What is claimed is:

1. A method of making refractory bodies formed with a plurality of closely spaced ducts extending in a common direction, having a diameter of approximately 4 to 10 millimeters, and smooth walls of refractory material, the method comprising:
    (a) mounting a plurality of elongated core members in a mold, the core members conforming to said ducts;
    (b) casting a composition into said mold,
        (1) the composition consisting essentially of granular material having a grain size distribution within the limits indicated by the hatched area of FIG. 7, an amount of binder which is between 1 and 4% of the weight of said granular material, and between approximately 5 and 7% water based on the dry solids of said composition,
        (2) said granular material consisting of particles containing at least 85% MgO, the remainder of said particles consisting essentially of CaO, $Fe_2O_3$, and $SiO_2$, and
        (3) said binder being a member of the group consisting of sodium sulfate, sodium sulfite, magnesium chloride, and potassium chromate;
    (c) vibrating said composition in said mold;
    (d) then solidifying said composition by evaporating a portion of said water until the composition is shape retaining;
    (e) removing said core members from the shape retaining composition; and
    (f) removing the shape retaining composition from said mold.

2. A method as set forth in claim 1, wherein said ducts have a length-to-diameter ratio of approximately 30:1 to 250:1.

3. A method as set forth in claim 1, wherein said core members each include an elongated tubular member of elastomeric material and a stiffener member received in said tubular member and longitudinally coextensive therewith.

4. A method as set forth in claim 3, wherein said stiffener member is a wire.

5. A method as set forth in claim 1, wherein the maximum dimension of each core member transversely to its length is substantially less than 10 millimeters.

References Cited

UNITED STATES PATENTS

| 2,829,879 | 4/1958 | Kosmider et al. | |
| 3,233,015 | 2/1966 | Davies | 264—30 |
| 3,257,217 | 6/1966 | Van Dreser et al. | 106—60 X |
| 3,259,672 | 7/1966 | Oswald et al. | 264—30 |

ROBERT F. WHITE, *Primary Examiner.*

J. H. SILBAUGH, *Assistant Examiner.*

U.S. Cl. X.R.

106—59, 60; 264—30, 59, 63